United States Patent
Franke et al.

(10) Patent No.: US 8,857,075 B2
(45) Date of Patent: Oct. 14, 2014

(54) PRODUCTION OF SMOKING PRODUCTS BY THERMAL EXTRUSION

(75) Inventors: Dietmar Franke, Bayreuth (DE); Gerald Schmekel, Elmshorn (DE)

(73) Assignee: British American Tobacco (Germany) GmbH, Hamburg (DE)

( * ) Notice: Subject to any disclaimer, the term of this patent is extended or adjusted under 35 U.S.C. 154(b) by 678 days.

(21) Appl. No.: 13/130,609

(22) PCT Filed: Sep. 17, 2009

(86) PCT No.: PCT/EP2009/062049
§ 371 (c)(1),
(2), (4) Date: Aug. 15, 2011

(87) PCT Pub. No.: WO2010/060665
PCT Pub. Date: Jun. 3, 2010

(65) Prior Publication Data
US 2011/0283556 A1   Nov. 24, 2011

(30) Foreign Application Priority Data
Nov. 26, 2008  (DE) .......................... 10 2008 059 031

(51) Int. Cl.
- F26B 5/14 (2006.01)
- F26B 5/04 (2006.01)
- A24B 3/18 (2006.01)
- A23P 1/14 (2006.01)

(52) U.S. Cl.
CPC .. *A24B 3/18* (2013.01); *A23P 1/144* (2013.01)
USPC ................. 34/400; 34/414; 34/415; 131/291; 131/296

(58) Field of Classification Search
USPC ............ 34/413, 415, 402, 405, 398, 90, 414, 34/404, 397, 400; 131/291, 296, 375, 62, 131/300
See application file for complete search history.

(56) References Cited

U.S. PATENT DOCUMENTS

| | | | |
|---|---|---|---|
| 4,880,018 A | 11/1989 | Graves et al. | |
| 4,977,908 A * | 12/1990 | Luke | 131/375 |

(Continued)

FOREIGN PATENT DOCUMENTS

| | | |
|---|---|---|
| CA | 2584344 A1 | 6/2006 |
| CN | 85205018 U | 7/1986 |

(Continued)

OTHER PUBLICATIONS

Examination Report, dated Apr. 26, 2012, for Canadian Application No. 2,733,386. First Office Action issued on Dec. 4, 2012 for Chinese Patent Application No. 200980147077.9, filed on Sep. 17, 2009.
Examination Report #1, dated May 9, 2012, for Australian Patent Application No. 2009319280, filed Sep. 17, 2009.

(Continued)

*Primary Examiner* — Jiping Lu
*Assistant Examiner* — John McCormack
(74) *Attorney, Agent, or Firm* — NW Poulsen; LA Pinol

(57) ABSTRACT

The invention relates to a method for producing a smoking product from a tobacco material, wherein the tobacco material is treated using at least one extrusion process, which comprises compaction with an increase in pressure and temperature and a mechanical treatment and sudden flash drying of the material at an outlet of an extruder (1), wherein a heated process fluid (7) is supplied as a heat transfer medium to the tobacco material in the extruder (1) to supply process heat. The invention further relates to a device for producing a smoking product from a tobacco material using an extruder (1) which performs a compaction of a tobacco material with an increase in pressure and temperature and a mechanical treatment and sudden flash drying of the material at the extruder outlet, wherein the extruder (1) is associated with a heater (11), which heats a process fluid (7) that is supplied to the extruder (1) for supplying process heat as a heat transfer medium.

19 Claims, 3 Drawing Sheets

(56) References Cited

U.S. PATENT DOCUMENTS

Figure 1:
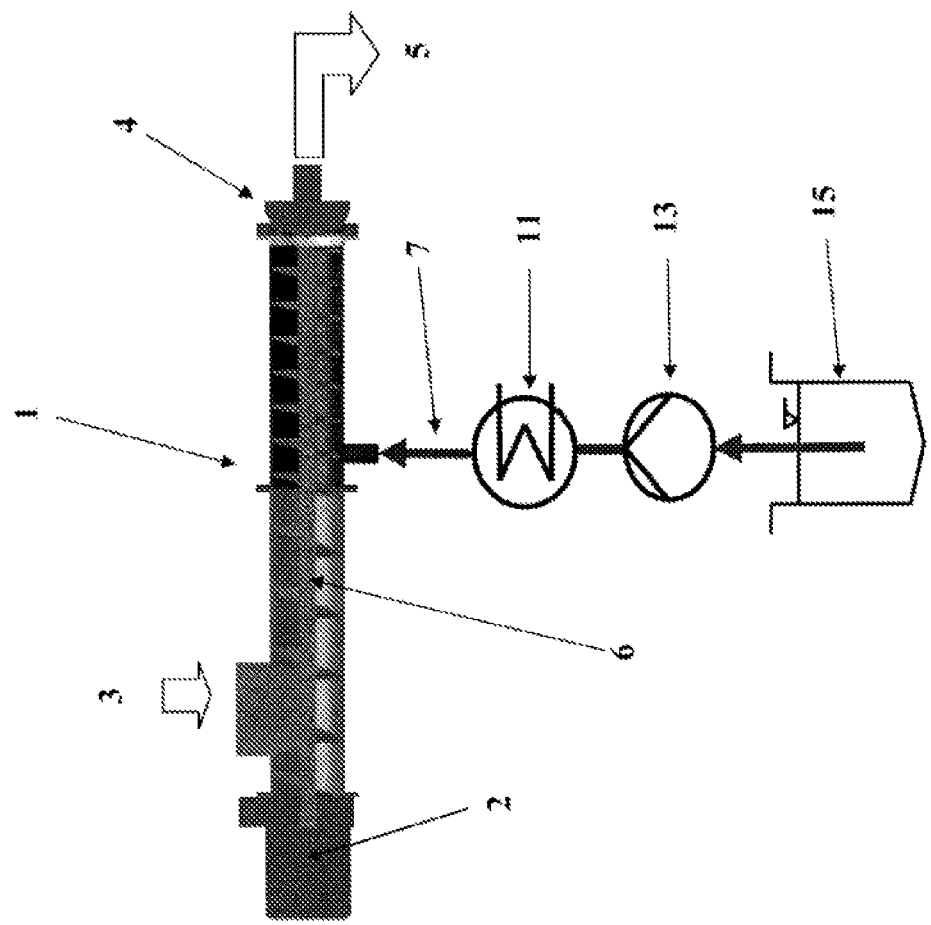

| | | | |
|---|---|---|---|
| 5,339,837 A | 8/1994 | Hirsch et al. | |
| 7,934,509 B2 * | 5/2011 | Ehling et al. | 131/297 |
| 2005/0178398 A1 | 8/2005 | Breslin et al. | |

FOREIGN PATENT DOCUMENTS

| | | |
|---|---|---|
| DE | 102004059388 A1 | 6/2006 |
| DE | 102005006117 A1 | 8/2006 |
| EP | 0515877 A2 | 12/1992 |
| EP | 1219186 A2 | 7/2002 |
| RU | 2053695 C1 | 2/1996 |
| RU | 2053695 C1 | 10/1996 |
| RU | 2363358 C1 | 8/2009 |
| SU | 1227153 A1 | 4/1986 |
| WO | WO/94/01007 A1 | 1/1994 |
| WO | WO9401007 A1 | 1/1994 |
| WO | WO/2006/061117 A1 | 6/2006 |
| WO | WO2006061117 A1 | 6/2006 |

OTHER PUBLICATIONS

Notice of Acceptance, dated Aug. 22, 2012, for Australian Patent Application No. 2009319280, filed Sep. 17, 2009.

Wikipedia article entitled "Extrusion", 9 pages, May 9, 2013.

Wikipedia article entitled "Extrusion (process engineering)" in German language with accompanying English translation, pp. 1-8, May 9, 2013.

Office Action issued in co-pending Russian Appl. No. 2011 117 067/12(025335), mailed Jun. 1, 2012 and accompanying translation in English and German.

International Search Report & Written Opinion corresponding to PCT/EP2009/062049 mailed Dec. 4, 2009 and English translation of International Search Report &Written Opinion.

Office Action issued for Uzbekistan Patent Application No. 20110177 IAP and accompanying German and English translations.

Wikipedia article entitled "Extrusion", 9 pages.

Wikipedia article entitled "Extrusion (process engineering)" in German language with accompanying English translation, pp. 1-8.

* cited by examiner

PRODUCTION OF SMOKING PRODUCTS BY THERMAL EXTRUSION

CLAIM FOR PRIORITY

This application is a National Stage Entry entitled to and hereby claims priority under 35 U.S.C. §§365 and 371 to corresponding PCT Application No. PCT/EP2009/062049, filed Sep. 17, 2009, which in turn claims priority to German Application Serial No. DE 102008059031.2, filed Nov. 26, 2008. The entire contents of the aforementioned applications are herein expressly incorporated by reference.

The present invention relates to a method for manufacturing a smoking product from a tobacco material, wherein the tobacco material is treated by at least one extrusion process, and to a device for manufacturing a smoking product from a tobacco material, comprising an extruder. It relates generally to the technical field of treating tobacco materials in an extruder.

In many extruder applications, in particular when treating amylaceous and cellulosic natural materials (foodstuffs), conditioning is an essential step. Conditioning is understood to mean setting a processing moistness using water or water vapour. These necessary tasks are often completed in upstream processes/apparatus, wherein the ability of natural materials to quickly absorb steam and/or water, with good penetration, is utilised. The apparatus are operated at ambient pressure.

In another standard method, pre-moistened materials are often dosed into the extruder input area. Pre-moistening has a negative influence on the free-flowing properties of the product. Depending on the material size and/or input geometry, this can lead to bridging and therefore a break-up of the feed mass flow.

The present invention can be used in the aforementioned field of treating foodstuffs in general and/or for foods and luxury foods. In this instance, however, the field of treating tobacco material shall be discussed in more detail.

In a conventional approach, a tobacco preparation substantially serves to manufacture fibrous particles from the raw product using a cutter. By contrast, extrusion offers significant advantages in tobacco treatment as compared to the conventional method steps; it is a "high-temperature short-time process".

The following table contrasts the process ranges for tobacco treatment:

|  | Extrusion | Conventional tobacco preparation |
| --- | --- | --- |
| Moisture | 20-25% | ~20-22% for cutting ~25-30% for drying |
| Temperature | 120-150° C. | <100° C. |
| Absolute pressure | up to 200 bars | ambient pressure |
| Processing time | <1 minute | >10 minutes |

During extrusion, in particular in mono-shaft extruders, the materials are exposed—depending on the mode of operation—to shearing forces which result in desired or even undesired heating, depending on the resultant temperature of the product (shearing energy input up to 0.1 kWh/kg). Depending on the temperature-sensitivity of the product, the process has to be cooled as applicable. The transport of material in the extruder is determined by the principles of drag flow, pressure flow and gap flow. The dissipative energy input is fed from the screw drive, i.e. by converting electrical energy into thermal energy.

DE 10 2004 059 388 A1 and DE 10 2005 006 117 A1 describe typical tobacco extrusions in which the tobacco starting material is heated to a temperature of 60° C.-180° C. in the extruder by shearing. These disclosed methods substantially use electrical energy for generating the heat.

Jacket-heating the extruder is also known, which however can only exchange small amounts of heat because the thermal resistance from the inner wall of the extruder to the tobacco mass is small and therefore determines the velocity. Also, convective tempering presumes a high fill level in the screw, which is not always the case.

It is the object of the invention to optimise the manufacture of smoking products using an extruder, mainly with regard to converting energy. In particular, the intention is to enable a manufacture in which extrusion is possible using a minimum of consumed electrical energy.

This object is solved by a method in accordance with claim 1 and a device in accordance with claim 8. The sub-claims define preferred embodiments of the invention.

In the method in accordance with the invention for manufacturing a smoking product from a tobacco material, the tobacco material is treated by at least one extrusion process which includes compressing it using an increase in pressure and temperature, and mechanically processing and instantaneous-decompression drying the material at an outlet of an extruder. A heated process fluid is supplied to the tobacco material in the extruder as a heat transfer medium for supplying process heat.

In this sense, the method in accordance with the present invention could also be referred to as "thermal extrusion," wherein in one variant, the term "thermal extrusion" is intended to refer to a configuration which intentionally introduces enthalpy directly into the extruder using transfer media. The necessary increase in temperature, which was previously created among other things by friction, is introduced in accordance with the invention directly or indirectly and at least partially by other energy transfer media, wherein the electrical energy consumed for heating, which is outdated in view of the present disclosure, is also minimized or eliminated.

The advantages of the described invention are not only due to the improvement in the balance of energy costs; an additional advantage of the invention is shown in the reduction in size of the motor, transmission and—as applicable—frequency converter, which also leads to a reduction in costs. The transfer of the necessary torque is also reduced. This enables the torsional stiffness of the screw core to be decreased (for example, a reduction in the diameter for the same outer diameter). This insight can be usefully put into practice, since a larger chamber depth of the screw achieves an increase in the mass flow due to an increased "drag volume" for the same diameter of the housing.

The table below compares the optimum modes of operation for inputting energy into the device.

|  | Energy input due to shearing | Energy input due to convection | Energy input due to transfer media |
| --- | --- | --- | --- |
| maximum screw fill level | completely (overfed) | almost completely | partially filled underfed |

In daily practice, the underfed mode of operation is preferred, since regions of the partially filled screw flights are in a non-pressurised state and the danger of occlusion is smaller. It is then easily possible to directly introduce the necessary amount of water at for example the available mains water pressure (3 bars). In very general terms, however, the process fluid can also be conveyed by means of a pump which is assigned to the extruder, before it is introduced into the extruder, wherein the pressure of the fluid is in particular increased to substantially the extruder pressure at the point of introduction, specifically before heating.

In accordance with the invention, it is advantageous to integrate operationally available heat transfer media and/or fluids, for example heated conditioning agents such as steam and water, wherein the process fluid can be heated in a heater which is assigned to the extruder, before it is introduced into the extruder.

The heated process fluid is advantageously in one of the following states:
- high-temperature water, in particular just below the boiling point at the prevailing pressure;
- superheated water, in particular in a temperature range of more than 100 to 350° C., specifically 200 to 300° C., and in a pressure range of 50 to 150 bars, specifically 80 to 120 bars; or
- superheated steam.

Values in bars relate to absolute pressures.

The process fluid can be introduced into the extruder at an increasing mass flow as the extruder temperature increases, specifically at a mass flow of 5 to 60 kg/h, in particular 30 to 45 kg/h.

The device in accordance with the invention for manufacturing a smoking product from a tobacco material has an extruder which compresses a tobacco material using an increase in pressure and temperature, and mechanically processes and instantaneous-decompression dries the material at the extruder outlet. The extruder is assigned a heater which heats a process fluid which is supplied to the extruder as a heat transfer medium for supplying process heat, wherein thermal energy is additionally (in addition to mechanical and external heating) supplied to the tobacco material.

In one embodiment, a pump is arranged in the process fluid transport path and conveys the fluid and in particular increases the pressure of the fluid to substantially the extruder pressure at the point of introduction. The pump can be arranged in the process fluid transport path upstream of the heater and in particular downstream of a fluid reservoir.

Figure 2:
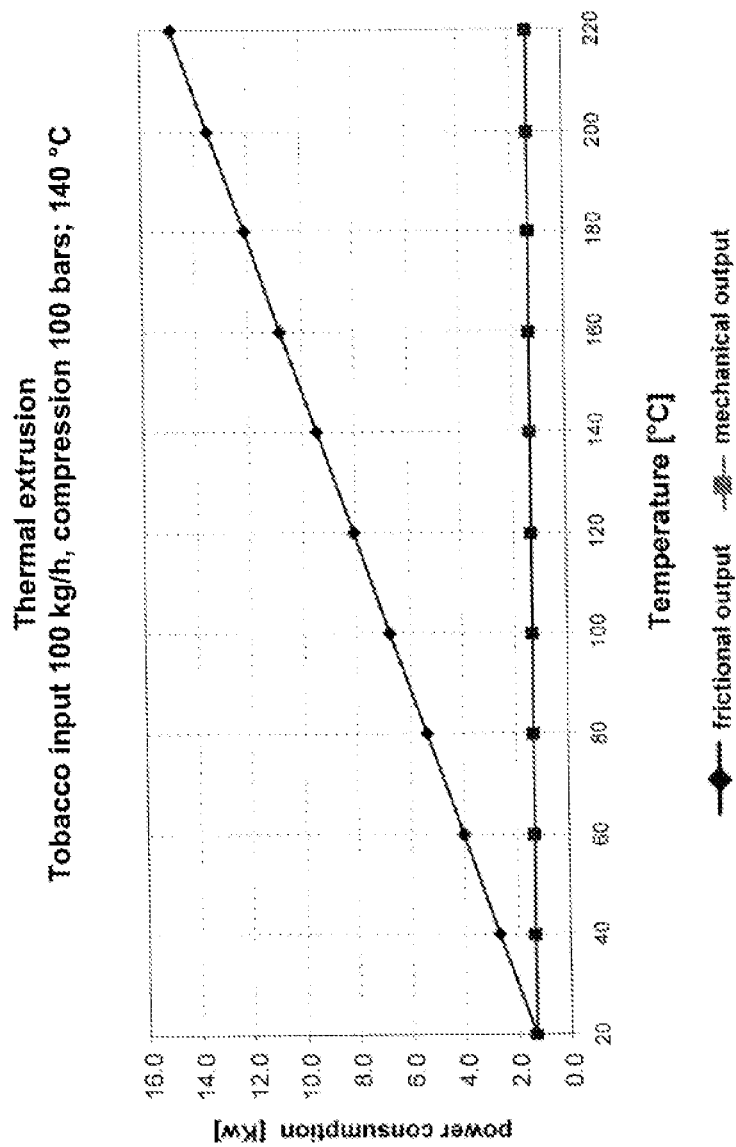

The invention is illustrated below in more detail on the basis of embodiments and by referring to the enclosed drawings. It can include any of the features described here, individually and in any expedient combination, and can also be interpreted as the use of the method variants and device variants shown here, in the field of manufacturing smoking products. The enclosed drawings show:

FIG. 1 a device configured in accordance with the invention, for manufacturing smoking products using thermal extrusion;

FIG. 2 a diagram which illustrates the energy utilisation in an extruder; and

Figure 3:
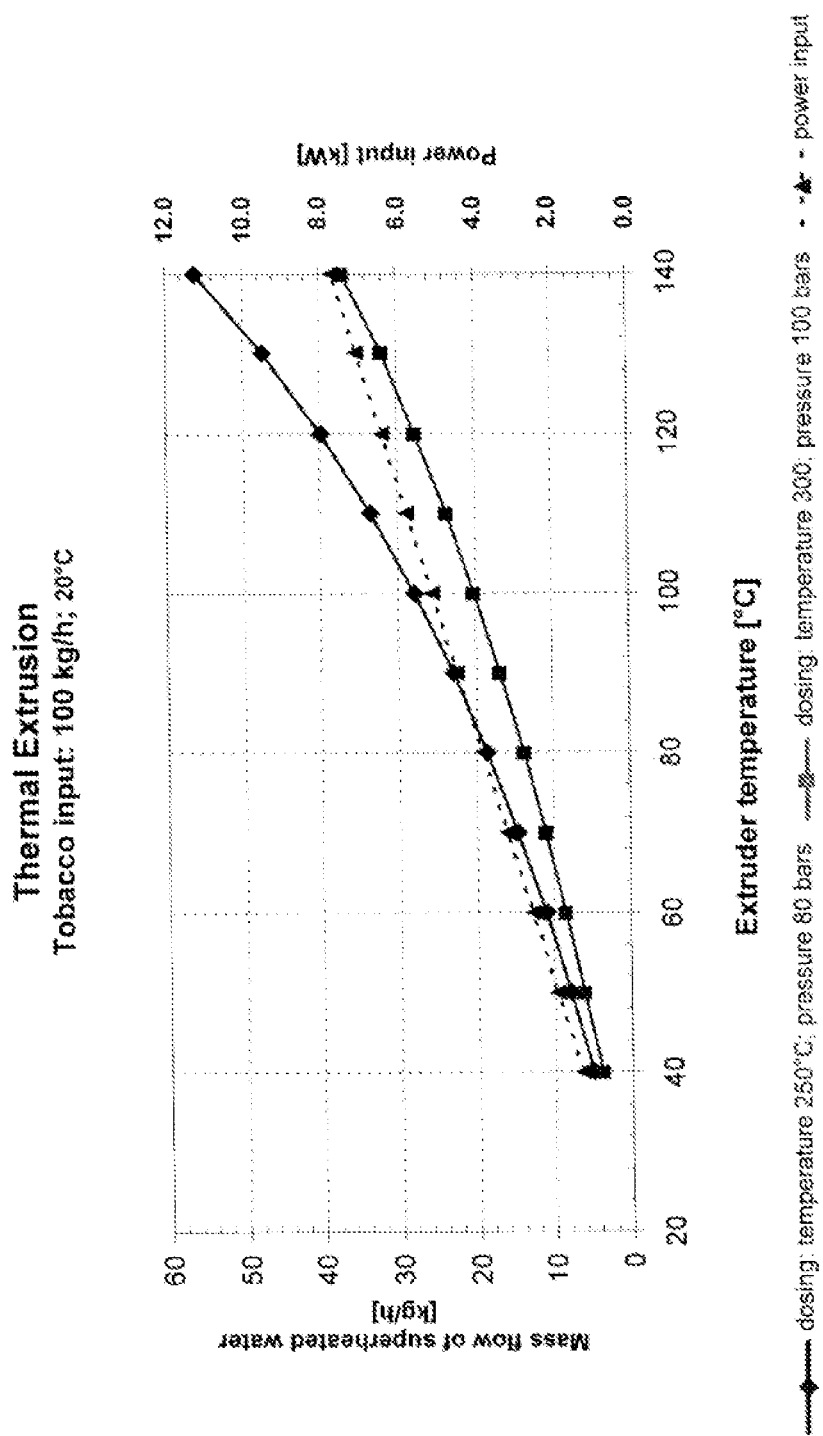

FIG. 3 a diagram which contrasts increase in temperature, mass flow and power input in thermal extrusion.

FIG. 1 shows a device for implementing the present invention. The extruder 1 shown has a drive 2 for a conveying screw 6 which is attached in the housing and conveys and compresses tobacco material which enters the extruder 1 at the point indicated by 3, wherein the screw 6 conveys and compresses the tobacco material until it reaches the shaping tool 4 on the right, where it is allowed to pass out through for example an opening and closing shearing gap, and is then available as a fibrous extrudate 5 for producing smoking products. In accordance with the invention, a heated process fluid 7 is introduced into the extruder 1, approximately in the middle of the device, wherein the fluid 7 (for example, heated water) has been heated beforehand in a heater 11, once it has been conveyed from a reservoir 15 using a pump 13.

Thus, in the embodiment shown here, conditioning transfer medium or fluid 7 (for example, water or steam) or other liquid constituents of the formula (moisture retention agents) are directly introduced into the extruder 1, wherein the fluid 7 can be heated to below the boiling point, in order to assist the process with a maximum of enthalpy. The boiling point depends of course on the process pressure; the higher the process pressure, the higher the possible dosing temperature and associated enthalpy input.

It should be mentioned that dosing water in the pressure region enables the process to be performed longer, despite abrasion of the screw 6. This observation is explained by the creeping increase in the fill level during the abrasive operation of the screw 6. This demands ever greater dosing pressures from the feeding device. An extended service life has a significant effect on the specific abrasion costs of the process and is thus very attractive.

The example of FIG. 2 shows the utilisation of electrical energy in an extruder, divided between frictional work (increase in temperature) and mechanical work. The diagram shows the electrical power which has to be inputted into the equipment in order to achieve particular temperatures in the tobacco product, wherein the parameters for the tobacco input (100 kg/h) and compression (100 bars) are pegged (as also in FIG. 3). The graph in FIG. 2 separately indicates the proportion which may be ascribed to transporting the amount of tobacco through the device and the proportion which feeds an increase in temperature due to internal friction. It is noticeable that the mechanical energy input, consisting of the work done by idling, the work done by compression and the work done by accelerating, is approximately constant. FIG. 2 clarifies that in an extrusion process, depending on process conditions, the consumed energy is mainly used for heating.

FIG. 3 shows the process parameter field for the increase in temperature as a function of the mass of flow of water. The second ordinate provides information concerning the power input. Thus, this diagram shows the curve of FIG. 2 already described above, relating to the right-hand Y axis, together with two curves (relating to the left-hand Y axis) in which the power input is achieved by means of another transfer medium (steam, saturated, superheated, etc.). The values for the amount of steam and the temperature achieved are measured values. They therefore end at 140° C., which is a typical working temperature for the present invention. Thus, FIG. 3 clarifies that introducing defined amounts of transfer medium at particular temperatures can replace the use of corresponding amounts of frictional energy by the electrical drive. Thus, by feeding in 30 kg/h of water at 300° C., it is perfectly possible to achieve a mixing temperature of about 130° C. If mechanical energy inputs (electric motor) can be avoided, it is on the one hand possible to construct and/or configure the entire plant to consume less energy and therefore be more cost-effective; on the other hand, it is possible to use a form of energy which can be generated more cheaply.

EXAMPLES/EXPERIMENTS

A mono-shaft extruder 1 is constantly fed, cold, with 100 kg/h of a dry tobacco product 3. The formula requires conditioning using 15 kg/h of water. Three experiments are performed in the device in accordance with FIG. 1 (without supplying heated fluid 7 in Experiments 1 and 2) in order to demonstrate the method in accordance with the invention:

Experiment 1

Comparative Experiment

In a first step, before extrusion, the raw product is treated with cold water in a conditioner (not shown in FIG. 1).

Experiment 2

Comparative Experiment

Conditioning with cold water is performed directly in the extruder.

Experiment 3

Experiment in Accordance with the Invention

Experiment 2 is repeated, except the water 7 is heated to 250° C. before it is inputted into the extruder 1. Dosing naturally presumes a corresponding working pressure in the extruder 1 and for example a plunger pump 13 in order to achieve the feeding conditions.
Result:
The extrusion experiments were performed and the power consumption of the drive recorded. Experiments 1 and 2 show a similar power consumption, wherein Experiment 2 tends to consume less power. The result may be explained by better conditioning (longer dwelling time) in the case of Experiment 1.

Experiment 3 consumed significantly less electrical drive output, which may be ascribed to the circumstances indicated above in the theoretical considerations (among other things: the possibility of underfeeding; greater effectiveness in the transfer of energy to the tobacco material; lesser occlusion effects and friction effects).

Accordingly, an advantageous extrusion for tobacco materials is provided in accordance with the invention, which uses the targeted input of enthalpy via a formula-specific medium in order to save (electrical) energy. Improved design possibilities for configuring the apparatus are also provided.

The invention claimed is:

1. A device for manufacturing a smoking product from a tobacco material, comprising an extruder which compresses a tobacco material using an increase in pressure and temperature, and mechanically processes and instantaneous-decompression dries the tobacco material at the extruder outlet, wherein the extruder is assigned a heater that heats a process fluid which is supplied directly to the tobacco in the extruder as a heat transfer medium, the device configured to supply substantially all of the process heat as enthalpy of the heated process fluid and configured to be operated in an underfed mode.

2. The device according to claim 1, wherein a pump is arranged in a process fluid transport path and conveys the process fluid and increases the pressure of the process fluid to substantially the extruder pressure at the point of introduction.

3. The device according to claim 1, wherein a pump is arranged in a process fluid transport path upstream of the heater and downstream of a fluid reservoir.

4. A method for manufacturing a smoking product from a tobacco material, comprising:
   treating tobacco material by at least one extrusion process which includes compressing the tobacco material using an increase in pressure and temperature; and
   mechanically processing and instantaneous-decompression drying the tobacco material at an outlet of an extruder, operating the extruder in an underfed mode,
   wherein substantially all of the process heat is supplied directly to the tobacco material in the extruder as enthalpy of a heated process fluid as a heat transfer medium.

5. The method according to claim 4, wherein the process fluid is heated in a heater assigned to the extruder, before it is introduced into the extruder.

6. The method according to claim 4, wherein the process fluid is conveyed by a pump assigned to the extruder, before it is introduced into the extruder, wherein the pressure of the process fluid is increased to a pressure that is substantially the same as the extruder pressure at the point of introduction before heating.

7. The method according to claim 4, wherein the process fluid is a heated conditioning agent.

8. The method according to claim 4, wherein the process fluid is high temperature water.

9. The method according to claim 4, wherein the process fluid is introduced into the extruder at an increasing mass flow as the extruder temperature increases.

10. The method according to claim 8, wherein the high-temperature water is just below the boiling point at the prevailing pressure.

11. The method according to claim 4, wherein the process fluid is superheated water.

12. The method according to claim 11, wherein the superheated water is in a temperature range of 100 to 350° C.

13. The method according to claim 11, wherein the superheated water is in a temperature range of 200 to 300° C.

14. The method according to claim 11 wherein the superheated water is in a pressure range of 50 to 150 bars.

15. The method according to claim 11 wherein the superheated water is in a pressure range of 80 to 120 bars.

16. The method according to claim 4, wherein the process fluid is steam.

17. The method according to claim 4 wherein the process fluid is superheated steam.

18. The method according to claim 9, wherein the mass flow ranges from 5 to 60 kg/h.

19. The method according to claim 9, wherein the mass flow ranges from 30 to 45 kg/h.

\* \* \* \* \*

UNITED STATES PATENT AND TRADEMARK OFFICE
CERTIFICATE OF CORRECTION

| | | |
|---|---|---|
| PATENT NO. | : 8,857,075 B2 | Page 1 of 1 |
| APPLICATION NO. | : 13/130609 | |
| DATED | : October 14, 2014 | |
| INVENTOR(S) | : Dietmar Franke and Gerald Schmekel | |

It is certified that error appears in the above-identified patent and that said Letters Patent is hereby corrected as shown below:

On the title page, Item 30 under Foreign Application Priority Data, "10 2008 059 031" should read --10 2008 059 031.2--

On the title page, under References Cited (second page), please remove "RU 2053695 C1 10/1996"

Signed and Sealed this
Twenty-first Day of April, 2015

Michelle K. Lee
*Director of the United States Patent and Trademark Office*